(12) United States Patent
Liao (10) Patent No.: US 9,207,507 B2
(45) Date of Patent: Dec. 8, 2015

(54) PIXEL STRUCTURE HAVING COMMON ELECTRODE AND PIXEL ELECTRODE PARTLY OVERLAPPING EACH OTHER TO FORM STORAGE CAPACITOR

(71) Applicant: Shenzhen China Star Optoelectronics Technology Co., Ltd., Shenzhen, Guangdong (CN)

(72) Inventor: Zuomin Liao, Guangdong (CN)

(73) Assignee: Shenzhen China Star Optoelectronics Technology Co., Ltd, Shenzhen, Guangdong ( * ) Notice: Subject to any disclaimer, the term of this patent is extended or adjusted under 35 U.S.C. 154(b) by 98 days.

(21) Appl. No.: 14/349,290

(22) PCT Filed: Jan. 22, 2014

(86) PCT No.: PCT/CN2014/071042
§ 371 (c)(1),
(2) Date: Apr. 2, 2014

(87) PCT Pub. No.: WO2015/096251
PCT Pub. Date: Jul. 2, 2015

(65) Prior Publication Data
US 2015/0185569 A1    Jul. 2, 2015

(30) Foreign Application Priority Data

Dec. 27, 2013 (CN) .......................... 2013 1 0739637

(51) Int. Cl.
G02F 1/1343 (2006.01)
G02F 1/1335 (2006.01)
G02F 1/1362 (2006.01)
G02F 1/1333 (2006.01)
G02F 1/1368 (2006.01)

(52) U.S. Cl.
CPC ........ *G02F 1/136213* (2013.01); *G02F 1/1368* (2013.01); *G02F 1/133345* (2013.01); *G02F 1/133512* (2013.01); *G02F 1/133514* (2013.01); *G02F 1/136227* (2013.01); *G02F 1/136286* (2013.01)

(58) Field of Classification Search
CPC ............ G02F 1/136213; G02F 1/1368; G02F 1/136286; G02F 1/133345; G02F 1/133512; G02F 1/133514; G02F 1/136227; G02F 1/134336; G02F 1/133707; G02F 1/1393; G02F 2001/134345; H01L 27/12
USPC ....................................... 349/38, 39, 143, 106
See application file for complete search history.

(56) References Cited

U.S. PATENT DOCUMENTS

| 6,255,130 B1 * | 7/2001 | Kim | ..................... H01L 27/1214 438/158 |
| 2012/0099041 A1 * | 4/2012 | Xie | ....................... G02F 1/1343 349/42 |

*Primary Examiner* — Mike Qi
(74) *Attorney, Agent, or Firm* — Andrew C. Cheng (57) ABSTRACT

The present invention provides a structure of a pixel, which includes an array substrate (10), a color filter substrate (20), and a liquid crystal layer (30) between the array substrate (10) and the color filter substrate (20). The array substrate (10) includes a first substrate (11), a data line (12) and a gate line (13) arranged on the first substrate (11), and a pixel unit (14). The pixel unit (14) includes a thin-film transistor (15) and a pixel electrode (16). The thin-film transistor (15) is electrically connected to the data line (12), the gate line (13), and the pixel electrode (16). The color filter substrate (20) includes a second substrate (21) and a common electrode (22) arranged on the second substrate (21). The common electrode (22) and the pixel electrode (16) have a first overlapping portion (23), which forms a first storage capacitor of the pixel unit (14).

17 Claims, 5 Drawing Sheets

PIXEL STRUCTURE HAVING COMMON ELECTRODE AND PIXEL ELECTRODE PARTLY OVERLAPPING EACH OTHER TO FORM STORAGE CAPACITOR

BACKGROUND OF THE INVENTION

1. Field of the Invention

The present invention relates to the field of display technology, and in particular to a structure of a pixel that increases transmittance of liquid crystal and reduce power consumption.

2. The Related Arts

Nowadays, technology and science have been in prosperous development and progress and information devices are constantly innovated to suit the need of the public. The early displays were mostly cathode ray tube (CRT) displays, which is of a bulky size and a great power consumption and also generates radiations that are dangerous to human body for user operating for a long while. Thus, the displays that are currently available in the market are liquid crystal displays in substitution of the CRT displays.

Liquid crystal displays have a variety of advantages, such as thin device body, low power consumption, and being free of radiation, and are thus of wide applications. Most of the liquid crystal displays that are currently available in the market are backlighting liquid crystal displays, which comprise a liquid crystal panel and a backlight module. The operation principle of a liquid crystal panel is that liquid crystal molecules are interposed between two parallel glass substrates and a driving voltage is applied to the two glass substrates to control rotation direction of the liquid crystal molecules in order to refract out light emitting from the backlight module for generating images. Since the liquid crystal panel itself does not emit light, light must be provided from the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Figure 1:
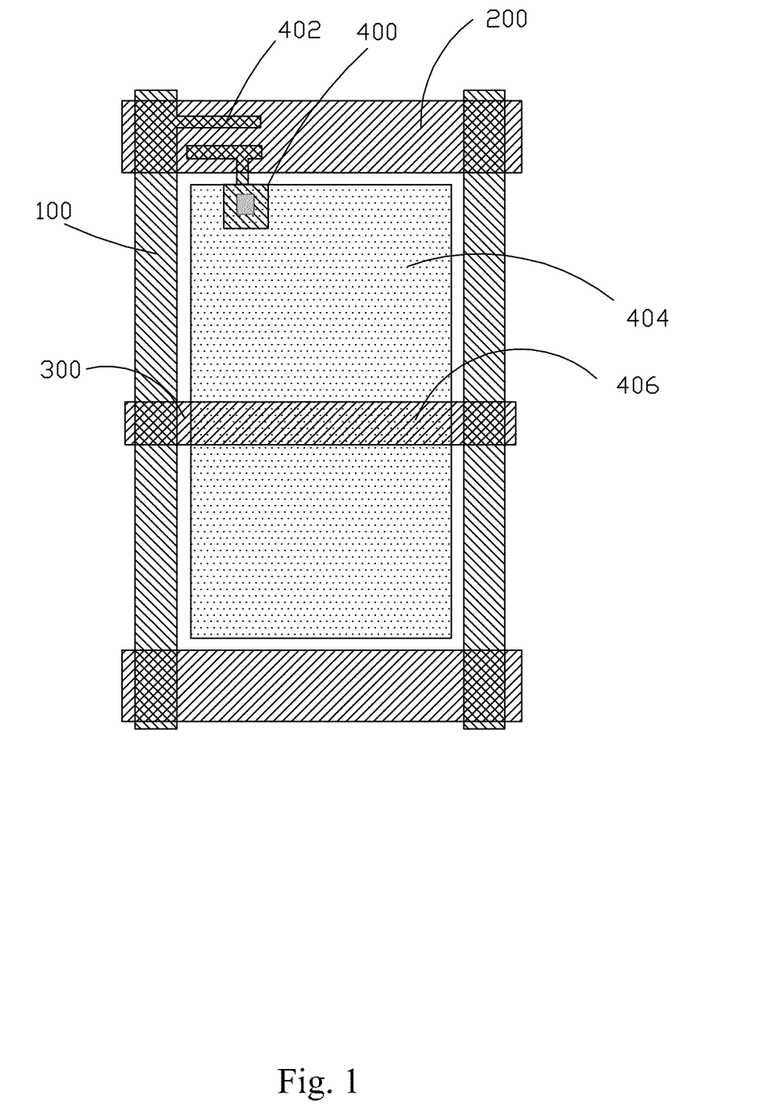
FIG. 1 is a schematic view showing a conventional structure of a pixel.

To improve flicking of a liquid crystal display, it is often to provide storage capacitance $C_{st}$ for stabilizing the potential of a pixel electrode. Referring to FIG. 1, a conventional pixel structure comprises: a data line 100, a gate line 200, a common electrode 300, and a pixel unit 400. The pixel unit 400 comprises: a pixel electrode 404, a thin-film transistor 402, and a storage capacitor 406. In the known techniques, the common electrode 300 is generally arranged on an array substrate of the pixel structure and has a portion overlapping the pixel electrode 404 to serve as the storage capacitance $C_{st}$ (namely $C_{st}$ on Array Com structure). However, the consequence of such an arrangement is a non-light-transmitting area is formed on the center of the pixel structure, leading to reduction of aperture rate of the pixel structure and thus reducing the transmittance of the liquid crystal display panel and increasing power consumption of the liquid crystal display. In another known technique, the pixel electrode has a portion overlapping a gate line to serve as the storage capacitance (namely $C_{st}$ on Gate structure). This is increases the loading of the gate line, leading to displaying inhomogeneity of the liquid crystal display panel.

SUMMARY OF THE INVENTION

An object of the present invention is to provide a pixel structure, in which a pixel electrode has a portion overlapping a common electrode of a color filter substrate to serve as storage capacitance, in order to increase the transmittance of liquid crystal, reducing the energy consumption of a liquid crystal display using the pixel structure, and enhancing displaying homogeneity of the liquid crystal display using the pixel structure.

To achieve the object, the present invention provides a structure of a pixel, which comprises an array substrate, a color filter substrate, and a liquid crystal layer between the array substrate and the color filter substrate. The array substrate comprises a first substrate, a data line and a gate line arranged on the first substrate, and a pixel unit. The pixel unit comprises a thin-film transistor and a pixel electrode. The thin-film transistor is electrically connected to the data line, the gate line, and the pixel electrode. The color filter substrate comprises a second substrate and a common electrode arranged on the second substrate. The common electrode and the pixel electrode have a first overlapping portion, which forms a first storage capacitor of the pixel unit.

The thin-film transistor comprises a gate terminal, a source terminal, and a drain terminal. The gate terminal is electrically connected to the gate line. The source terminal is electrically connected to the data line. The drain terminal is electrically connected to the pixel electrode. The drain terminal and the pixel electrode are connected to each other through a via hole.

The first overlapping portion is formed at the site where the via hole is located.

The pixel electrode comprises a first fan-out section. The first fan-out section is arranged at a diagonal corner with respect to the thin-film transistor that belongs to the same pixel unit as the pixel electrode. The first overlapping portion is formed of the first fan-out section and the common electrode so as to form the first storage capacitor of the pixel unit.

The pixel unit further comprises a second storage capacitor. The pixel electrode comprises a second fan-out section. The second fan-out section is arranged at a diagonal corner with respect to the thin-film transistor that belongs to the same pixel unit as the pixel electrode. The second fan-out section and a gate line of a structure of another pixel have a second overlapping portion that forms the second storage capacitor.

The array substrate further comprises: a first metal layer formed on the first substrate, an insulation layer formed on the first metal layer and the first substrate, a second metal layer formed on the insulation layer, a protective layer formed on the second metal layer and the insulation layer, a first transparent conductive layer formed on the protective layer, and a first alignment film formed on the first transparent conductive layer.

The color filter substrate further comprises: a first black matrix and a pigment layer formed on the second substrate, a second transparent conductive layer formed on the first black matrix and the pigment layer, a spacer formed on the second transparent conductive layer, and a second alignment film formed on the spacer and the second transparent conductive layer.

The pigment layer comprises: a second black matrix formed on the second substrate, a first red pigment layer formed on the second black matrix, a first green pigment layer formed on the first red pigment layer and the second black matrix, and a first blue pigment layer formed on the first green pigment layer.

The pigment layer comprises: a second red pigment layer formed on the second substrate, a second blue pigment layer formed on the second red pigment layer and the second substrate, and a second green pigment layer formed on the second blue pigment layer.

The first substrate comprises a glass substrate or a plastic substrate and the second substrate comprises a glass substrate or a plastic substrate.

The present invention also provides a structure of a pixel, which comprises an array substrate, a color filter substrate, and a liquid crystal layer between the array substrate and the color filter substrate, the array substrate comprising a first substrate, a data line and a gate line arranged on the first substrate, and a pixel unit, the pixel unit comprising a thin-film transistor and a pixel electrode, the thin-film transistor being electrically connected to the data line, the gate line, and the pixel electrode, the color filter substrate comprising a second substrate and a common electrode arranged on the second substrate, the common electrode and the pixel electrode having a first overlapping portion, which forms a first storage capacitor of the pixel unit;

wherein the thin-film transistor comprises a gate terminal, a source terminal, and a drain terminal, the gate terminal being electrically connected to the gate line, the source terminal being electrically connected to the data line, the drain terminal being electrically connected to the pixel electrode, the drain terminal and the pixel electrode being connected to each other through a via hole;

wherein the first overlapping portion is formed at the site where the via hole is located;

wherein the pixel unit further comprises a second storage capacitor, the pixel electrode comprising a second fan-out section, the second fan-out section being arranged at a diagonal corner with respect to the thin-film transistor that belongs to the same pixel unit as the pixel electrode, the second fan-out section and a gate line of a structure of another pixel having a second overlapping portion that forms the second storage capacitor; and wherein the array substrate further comprises: a first metal layer formed on the first substrate, an insulation layer formed on the first metal layer and the first substrate, a second metal layer formed on the insulation layer, a protective layer formed on the second metal layer and the insulation layer, a first transparent conductive layer formed on the protective layer, and a first alignment film formed on the first transparent conductive layer.

The color filter substrate further comprises: a first black matrix and a pigment layer formed on the second substrate, a second transparent conductive layer formed on the first black matrix and the pigment layer, a spacer formed on the second transparent conductive layer, and a second alignment film formed on the spacer and the second transparent conductive layer.

The pigment layer comprises: a second black matrix formed on the second substrate, a first red pigment layer formed on the second black matrix, a first green pigment layer formed on the first red pigment layer and the second black matrix, and a first blue pigment layer formed on the first green pigment layer.

The pigment layer comprises: a second red pigment layer formed on the second substrate, a second blue pigment layer formed on the second red pigment layer and the second substrate, and a second green pigment layer formed on the second blue pigment layer.

The first substrate comprises a glass substrate or a plastic substrate and the second substrate comprises a glass substrate or a plastic substrate.

The efficacy of the present invention is that the present invention provides a structure of a pixel, wherein with an existing manufacture process being not changed, a pixel electrode is made overlapping a common electrode of a color filter substrate to form a storage capacitor and the storage capacitor is arranged at the site where a via hole connecting a drain terminal of a thin-film transistor and the pixel electrode is formed and/or at a diagonal corner with respect to the thin-film transistor that belongs to the same pixel unit as the pixel electrode, so as to increase the transmittance of liquid crystal, reduce the energy consumption of a liquid crystal display using the structure of the pixel, and enhance displaying homogeneity of the liquid crystal display using the structure of the pixel, with the manufacture cost being substantially unchanged.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
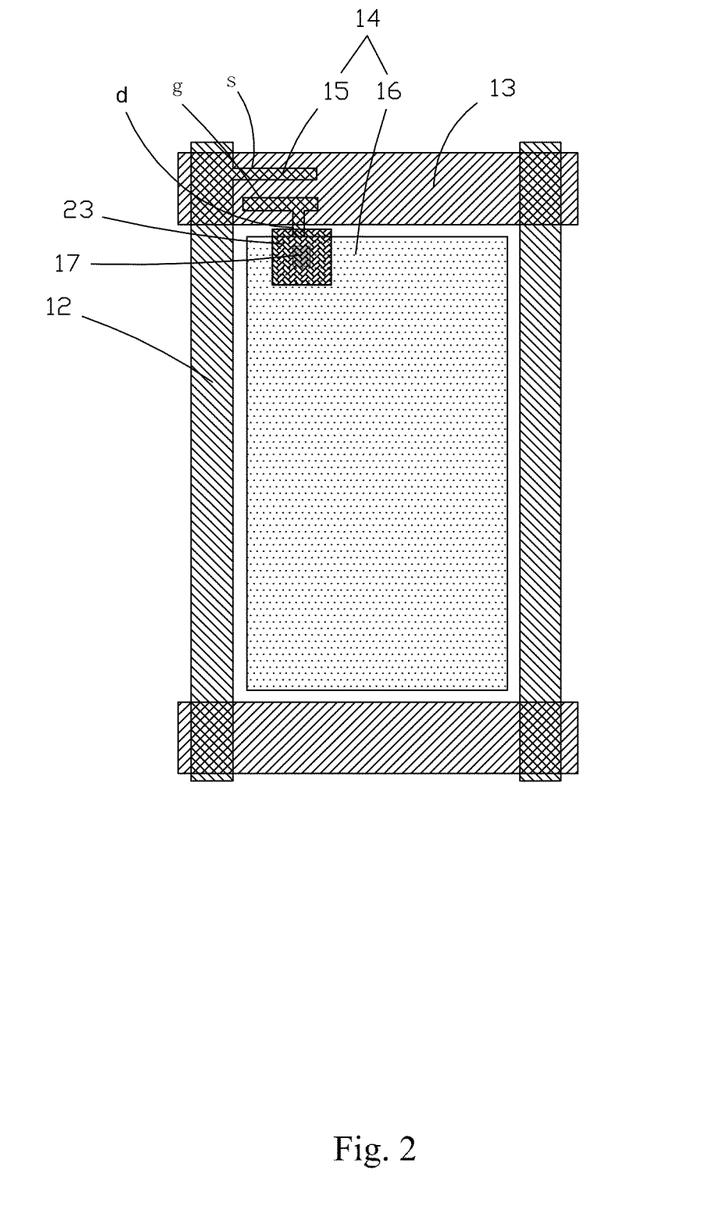
FIG. 2 is a schematic view showing a structure of a pixel according to an embodiment of the present invention.
Figure 3:
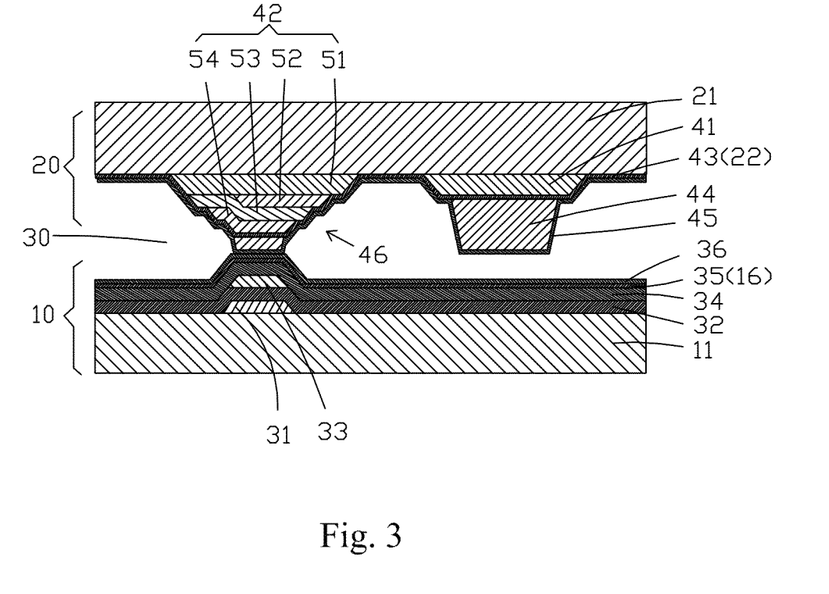
FIG. 3 is a schematic view showing a pigment layer of storage capacitance of the structure of the pixel according an embodiment of the present invention.

Referring to 2 and 3, the present invention provides a structure of a pixel, which comprises an array substrate 10, a color filter substrate 20, and a liquid crystal layer 30 between the array substrate 10 and the color filter substrate 20. The liquid crystal layer 30 contains liquid crystal molecules. The array substrate 10 comprises a first substrate 11, a data line 12 and a gate line 13 arranged on the first substrate 11, and a pixel unit 14. The pixel unit 14 comprises a thin-film transistor 15 and a pixel electrode 16. The thin-film transistor 15 is electrically connected to the data line 12, the gate line 13, and the pixel electrode 16. The thin-film transistor 15 functions to respond to a scan signal supplied on the gate line 13 to apply a plurality of data signal supplied on the data line 12 to the pixel unit 14. The color filter substrate 20 comprises a second substrate 21 and a common electrode 22 arranged on the second substrate 21. The common electrode 22 and the pixel electrode 16 have a first overlapping portion 23, which forms a first storage capacitor $C_{st}$ for the pixel unit 14. The present invention arranges the pixel electrode 16 and the common electrode 22 of the color filter substrate 20 to overlap each other so as to form the first storage capacitor $C_{st}$ for increasing transmittance of liquid crystal, reducing energy consumption of a liquid crystal display using the structure of the pixel, and enhancing displaying homogeneity of the liquid crystal display using the structure of the pixel.

Specifically, the thin-film transistor 15 comprises a gate terminal g, a source terminal s, and a drain terminal d. The gate terminal g is electrically connected to the gate line 13. The source terminal s is electrically connected to the data line 12. The drain terminal d is electrically connected to the pixel electrode 16. The drain terminal d and the pixel electrode 16 are connected to each other through a via hole 17. The first overlapping portion 23 is formed on the site where the via hole 17 is located to facilitate increasing the charging speed of the first storage capacitor $C_{st}$.

The array substrate 10 further comprises: a first metal layer 31 formed on the first substrate 11, an insulation layer 32 formed on the first metal layer 31 and the first substrate 11, a second metal layer 33 formed on the insulation layer 32, a protective layer 34 formed on the second metal layer 33 and the insulation layer 32, a first transparent conductive layer 35 (which forms the pixel electrode 16) formed on the protective layer 34, and a first alignment film 36 formed on the first transparent conductive layer 35. The first substrate 11 can be a glass substrate or a plastic substrate.

The color filter substrate 20 further comprises: a first black matrix 41 and a pigment layer 42 formed on the second substrate 21, a second transparent conductive layer 43 (which forms the common electrode 22) formed on the first black matrix 41 and the pigment layer 42, a spacer 44 formed on the second transparent conductive layer 43, and a second alignment film 45 formed on the spacer 44 and the second transparent conductive layer 43. The second substrate 21 can be a glass substrate or a plastic substrate. The liquid crystal layer 30 is arranged between the first and second alignment films 36, 45. The first storage capacitor $C_{st}$ is formed at the site where the pigment layer 42 is located.

The pigment layer 42 forms a projection 46 between the second transparent conductive layer 43 and the second substrate 21 of the color filter substrate 20 and the projection 46 helps reduce the distance between the second transparent conductive layer 43 of the color filter substrate 20 and the first transparent conductive layer 35 of the array substrate 10 so as to facilitate the formation of the first storage capacitor $C_{st}$.

Referring to FIG. 3, which is a schematic view showing the structure of an embodiment of the pigment layer 42 at the site of the first storage capacitor $C_{st}$, the pigment layer 42 comprises: a second black matrix 51 formed on the second substrate 21, a first red pigment layer 52 formed on the second black matrix 51, a first green pigment layer 53 formed on the first red pigment layer 52 and the second black matrix 51, and a first blue pigment layer 54 formed on the first green pigment layer 53.

Figure 4:
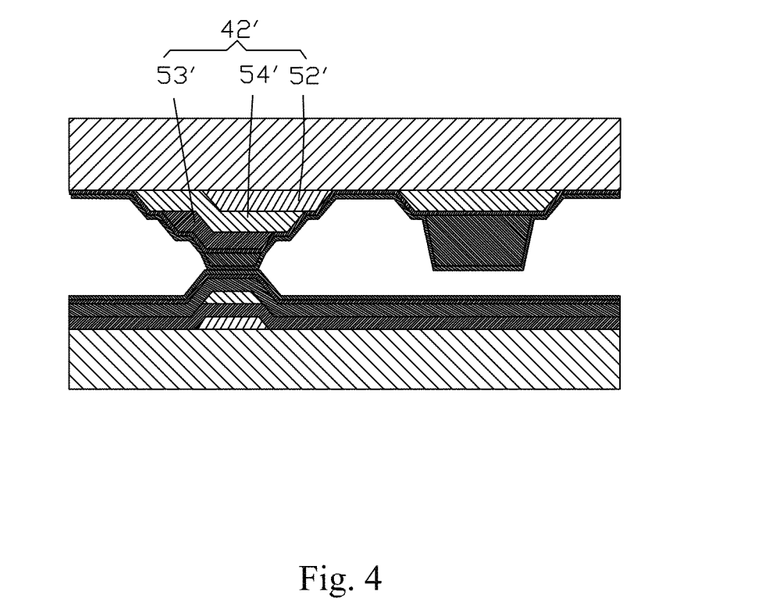
FIG. 4 is a schematic view showing a pigment layer of storage capacitance of the structure of the pixel according another embodiment of the present invention.

Referring to FIG. 4, which is a schematic view showing the structure of another embodiment of the pigment layer 42' at the site of the first storage capacitor $C_{st}$, the pigment layer 42' comprises a second red pigment layer 52' formed on the second substrate 21, a second blue pigment layer 54' formed on the second red pigment layer 52' and the second substrate 21, and a second green pigment layer 53' formed on the second blue pigment layer 54'.

The structure of the pigment layer at the site of the first storage capacitor is not limited to the two arrangements described above and can be a structure comprising one layer selected from a black matrix, a red pigment layer, a green pigment layer, and a blue pigment layer, or two stacked layers selected from them, or three stacked layers selected from them.

Figure 5:
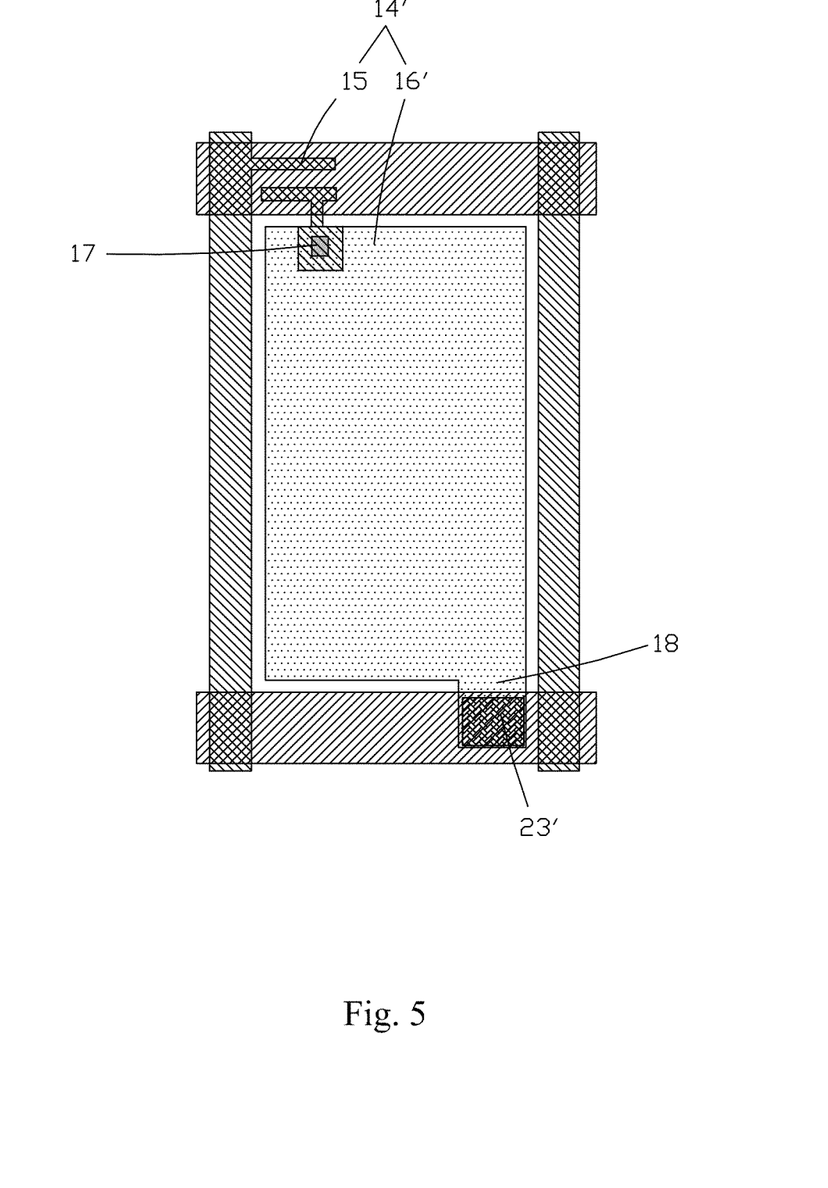
FIG. 5 is a schematic view showing a structure of a pixel according to another embodiment of the present invention.

Referring to FIG. 5, which shows another preferred embodiment as an alternative, the pixel electrode 16' comprises a first fan-out section 18. The first fan-out section 18 is arranged at a diagonal corner with respect to the thin-film transistor 15 that belongs to the same pixel unit 14' as the pixel electrode 16'. The first overlapping portion 23' is formed of the first fan-out section 18 and the common electrode 22 to form the first storage capacitor $C_{st}$ for the pixel unit 14'. This embodiment simplifies the structure of the via hole 17 of the drain terminal d and the pixel electrode 16' so as to facilitate the manufacture thereof.

Figure 6:
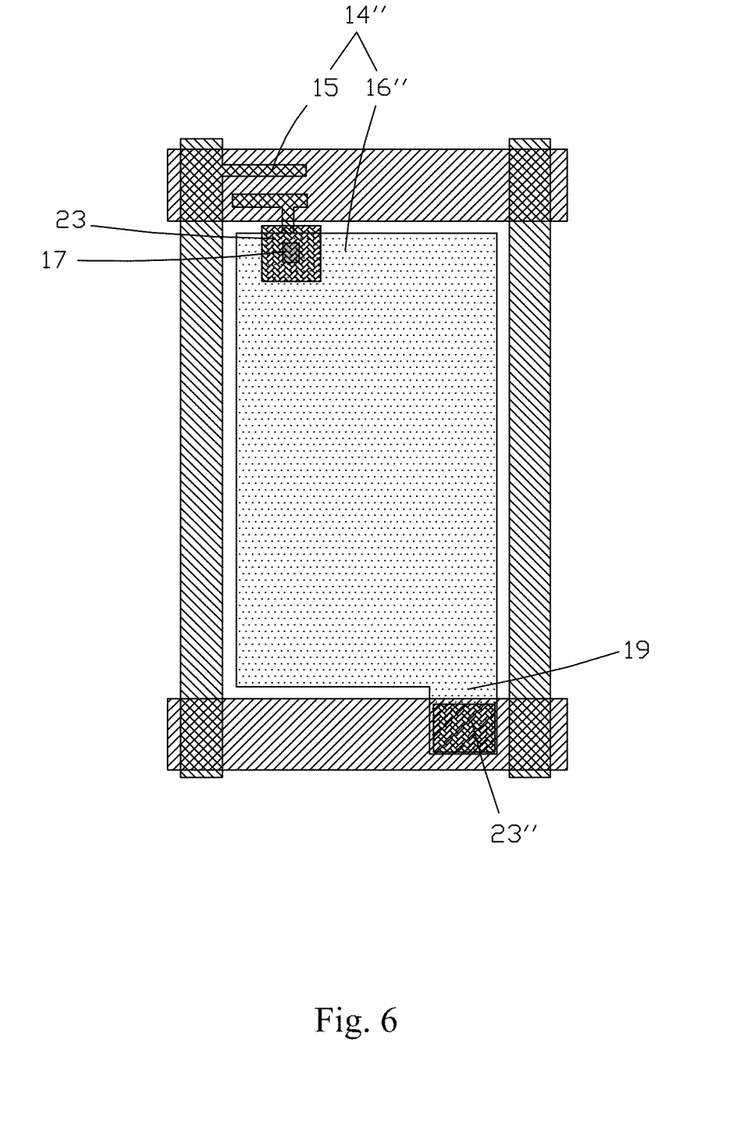
FIG. 6 is a schematic view showing a structure of a pixel according to a further embodiment of the present invention.

Referring to FIG. 6, which shows a further preferred embodiment as an alternative, in the instant embodiment, a structure of a pixel comprises a first storage capacitor $C_{st}$ and a second storage capacitor $C_{st}$. The first storage capacitor $C_{st}$, as described above, is formed of the first overlapping portion 23 at the site of the via holes 17 connecting between the drain terminal d and the pixel electrode 16". The second storage capacitor $C_{st}$ has a structure as follows: The pixel electrode 16" comprises a second fan-out section 19 and the second fan-out section 19 is arranged at a diagonal corner with respect to the thin-film transistor 15 that belongs to the same pixel unit 14" as the pixel electrode 16". The second fan-out section 19 and a gate line 13 of the structure of another pixel have a second overlapping portion 23", forming the second storage capacitor $C_{st}$ of the pixel unit 14"'.

In summary, the present invention provides a structure of a pixel, wherein with an existing manufacture process being not changed, a pixel electrode is made overlapping a common electrode of a color filter substrate to form a storage capacitor and the storage capacitor is arranged at the site where a via hole connecting a drain terminal of a thin-film transistor and the pixel electrode is formed and/or at a diagonal corner with respect to the thin-film transistor that belongs to the same pixel unit as the pixel electrode, so as to increase the transmittance of liquid crystal, reduce the energy consumption of a liquid crystal display using the structure of the pixel, and enhance displaying homogeneity of the liquid crystal display using the structure of the pixel, with the manufacture cost being substantially unchanged.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A structure of a pixel, comprising an array substrate, a color filter substrate, and a liquid crystal layer between the array substrate and the color filter substrate, the array substrate comprising a first substrate, a data line and a gate line arranged on the first substrate, and a pixel unit, the pixel unit comprising a thin-film transistor and a pixel electrode, the thin-film transistor being electrically connected to the data line, the gate line, and the pixel electrode, the color filter substrate comprising a second substrate and a common electrode arranged on the second substrate, the common electrode and the pixel electrode having a first overlapping portion, which forms a first storage capacitor of the pixel unit;

wherein the thin-film transistor comprises a gate terminal, a source terminal, and a drain terminal, the gate terminal being electrically connected to the gate line, the source terminal being electrically connected to the data line, the drain terminal being electrically connected to the pixel electrode, the drain terminal and the pixel electrode being connected to each other through a via hole; and wherein the first overlapping portion is formed at the site where the via hole is located.

2. The structure of the pixel as claimed in claim 1, wherein the pixel electrode comprises a first fan-out section, the first fan-out section being arranged at a diagonal corner with respect to the thin-film transistor that belongs to the same pixel unit as the pixel electrode, the first overlapping portion being formed of the first fan-out section and the common electrode so as to form the first storage capacitor of the pixel unit.

3. The structure of the pixel as claimed in claim 1, wherein the pixel unit further comprises a second storage capacitor, the pixel electrode comprising a second fan-out section, the second fan-out section being arranged at a diagonal corner with respect to the thin-film transistor that belongs to the same pixel unit as the pixel electrode, the second fan-out section and a gate line of a structure of another pixel having a second overlapping portion that forms the second storage capacitor.

4. The structure of the pixel as claimed in claim 1, wherein the array substrate further comprises: a first metal layer formed on the first substrate, an insulation layer formed on the first metal layer and the first substrate, a second metal layer formed on the insulation layer, a protective layer formed on the second metal layer and the insulation layer, a first transparent conductive layer formed on the protective layer, and a first alignment film formed on the first transparent conductive layer.

5. The structure of the pixel as claimed in claim 1, wherein the color filter substrate further comprises: a first black matrix and a pigment layer formed on the second substrate, a second transparent conductive layer formed on the first black matrix and the pigment layer, a spacer formed on the second transparent conductive layer, and a second alignment film formed on the spacer and the second transparent conductive layer.

6. The structure of the pixel as claimed in claim 5, wherein the pigment layer comprises: a second black matrix formed on the second substrate, a first red pigment layer formed on the second black matrix, a first green pigment layer formed on the first red pigment layer and the second black matrix, and a first blue pigment layer formed on the first green pigment layer.

7. The structure of the pixel as claimed in claim 5, wherein the pigment layer comprises: a second red pigment layer formed on the second substrate, a second blue pigment layer formed on the second red pigment layer and the second substrate, and a second green pigment layer formed on the second blue pigment layer.

8. The structure of the pixel as claimed in claim 1, wherein the first substrate comprises a glass substrate or a plastic substrate and the second substrate comprises a glass substrate or a plastic substrate.

9. A structure of a pixel, comprising an array substrate, a color filter substrate, and a liquid crystal layer between the array substrate and the color filter substrate, the array substrate comprising a first substrate, a data line and a gate line arranged on the first substrate, and a pixel unit, the pixel unit comprising a thin-film transistor and a pixel electrode, the thin-film transistor being electrically connected to the data line, the gate line, and the pixel electrode, the color filter substrate comprising a second substrate and a common electrode arranged on the second substrate, the common electrode and the pixel electrode having a first overlapping portion, which forms a first storage capacitor of the pixel unit;

wherein the thin-film transistor comprises a gate terminal, a source terminal, and a drain terminal, the gate terminal being electrically connected to the gate line, the source terminal being electrically connected to the data line, the drain terminal being electrically connected to the pixel electrode, the drain terminal and the pixel electrode being connected to each other through a via hole;

wherein the first overlapping portion is formed at the site where the via hole is located;

wherein the pixel unit further comprises a second storage capacitor, the pixel electrode comprising a second fan-out section, the second fan-out section being arranged at a diagonal corner with respect to the thin-film transistor that belongs to the same pixel unit as the pixel electrode, the second fan-out section and a gate line of a structure of another pixel having a second overlapping portion that forms the second storage capacitor; and wherein the array substrate further comprises: a first metal layer formed on the first substrate, an insulation layer formed on the first metal layer and the first substrate, a second metal layer formed on the insulation layer, a protective layer formed on the second metal layer and the insulation layer, a first transparent conductive layer formed on the protective layer, and a first alignment film formed on the first transparent conductive layer.

10. The structure of the pixel as claimed in claim 9, wherein the color filter substrate further comprises: a first black matrix and a pigment layer formed on the second substrate, a second transparent conductive layer formed on the first black matrix and the pigment layer, a spacer formed on the second transparent conductive layer, and a second alignment film formed on the spacer and the second transparent conductive layer.

11. The structure of the pixel as claimed in claim 10, wherein the pigment layer comprises: a second black matrix formed on the second substrate, a first red pigment layer formed on the second black matrix, a first green pigment layer formed on the first red pigment layer and the second black matrix, and a first blue pigment layer formed on the first green pigment layer.

12. The structure of the pixel as claimed in claim 11, wherein the pigment layer comprises: a second red pigment layer formed on the second substrate, a second blue pigment layer formed on the second red pigment layer and the second substrate, and a second green pigment layer formed on the second blue pigment layer.

13. The structure of the pixel as claimed in claim 9, wherein the first substrate comprises a glass substrate or a plastic substrate and the second substrate comprises a glass substrate or a plastic substrate.

14. A structure of a pixel, comprising an array substrate a color filter substrate and a liquid crystal layer between the array substrate and the color filter substrate, the array substrate comprising a first substrate, a data line and a gate line arranged on the first substrate, and a pixel unit, the pixel unit comprising a thin-film transistor and a pixel electrode, the thin-film transistor being electrically connected to the data line, the gate line, and the pixel electrode the color filter substrate comprising a second substrate and a common electrode arranged on the second substrate, the common electrode and the pixel electrode having a first overlapping portion, which forms a first storage capacitor of the pixel unit;

wherein the color filter substrate further comprises: a first black matrix and a pigment layer formed on the second substrate, a second transparent conductive layer formed on the first black matrix and the pigment layer, a spacer formed on the second transparent conductive layer, and a second alignment film formed on the spacer and the second transparent conductive layer.

15. The structure of the pixel as claimed in claim 14, wherein the pigment layer comprises: a second black matrix formed on the second substrate, a first red pigment layer formed on the second black matrix, and a first green pigment layer formed on the first red pigment layer and the second black matrix, and a first blue pigment later formed on the first green pigment layer.

16. The structure of the pixel as claimed in claim 14 wherein the pigment layer comprises: a second red pigment layer formed on the second substrate, a second blue pigment layer formed on the second red pigment layer and the second substrate, and a second green pigment layer formed on the second blue pigment layer.

17. The structure of the pixel as claimed in claim 14, wherein the first substrate comprises a glass substrate or a plastic substrate and the second substrate comprises a glass substrate or a plastic substrate.

* * * * *